United States Patent [19]
Sakurai et al.

[11] Patent Number: 4,675,260
[45] Date of Patent: Jun. 23, 1987

[54] LITHIUM BATTERY INCLUDING VANADIUM PENTOXIDE BASE AMORPHOUS CATHODE ACTIVE MATERIAL

[75] Inventors: Yoji Sakurai; Toshiro Hirai; Shigeto Okada; Takeshi Okada; Jun-ichi Yamaki; Hideaki Ohtsuka, all of Mito, Japan

[73] Assignee: Nippon Telegraph and Telephone Corporation, Tokyo, Japan

[21] Appl. No.: 796,084

[22] Filed: Nov. 8, 1985

[30] Foreign Application Priority Data

Nov. 12, 1984 [JP] Japan ................ 59-237778
Nov. 12, 1984 [JP] Japan ................ 59-237776
Nov. 12, 1984 [JP] Japan ................ 59-237777
Mar. 4, 1985 [JP] Japan ................ 60-41213
Mar. 11, 1985 [JP] Japan ................ 60-46480

[51] Int. Cl.[4] .................. H01M 6/16; H01M 6/18
[52] U.S. Cl. ........................ 429/191; 429/196; 429/218
[58] Field of Search .............. 429/218, 194, 196, 197, 429/199, 191, 193; 501/21, 41, 42, 45, 46; 252/182.1

[56] References Cited

U.S. PATENT DOCUMENTS 4,009,052 2/1977 Whittingham ............... 429/218 X
4,233,375 11/1980 Whittingham et al. ....... 429/218 X
4,243,624 1/1981 Jacobson et al. ............. 429/218 X
4,310,609 1/1982 Liang et al. .................. 429/218 X
4,316,777 2/1982 Dey ............................. 429/218 X

FOREIGN PATENT DOCUMENTS 0134561 8/1984 Japan ............................. 429/218

OTHER PUBLICATIONS

Journal of the Electrochemical Society, vol. 132, No. 2, Feb. 1985; "V$_2$O$_5$—P$_2$O$_5$ Glasses as Cathode for Lithium Secondary Battery"; Y. Sakurai.

Primary Examiner—Anthony Skapars
Attorney, Agent, or Firm—Oblon, Fisher, Spivak, McClelland & Maier

[57] ABSTRACT

A lithium battery essentially consisting of an amorphous cathode active material mainly composed of V$_2$O$_5$ and prepared by adding with at least one first additive selected from the group consisting of P$_2$O$_5$, TeO$_2$, GeO$_2$, Sb$_2$O$_3$, Bi$_2$O$_3$ and B$_2$O$_3$ and/or at least one second additive selected from the group consisting of MoO$_3$ and WO$_3$, heating to melt the admixture and then quenching the molten admixture; an anode active material made of metallic lithium or a lithium alloy; and an electrolyte made of a mixture of a aprotic solvent and a lithium salt. The battery is a small-sized and light-weight secondary battery having a high energy density and being improved in charge-discharge cycle lifetime.

15 Claims, 9 Drawing Figures

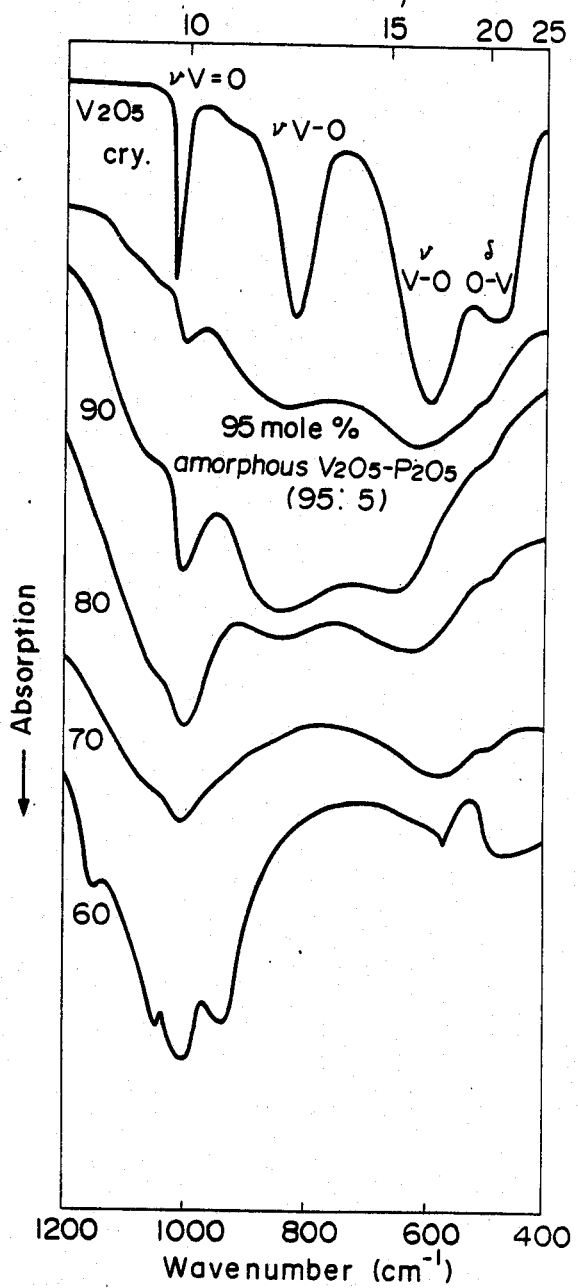

LITHIUM BATTERY INCLUDING VANADIUM PENTOXIDE BASE AMORPHOUS CATHODE ACTIVE MATERIAL

BACKGROUND OF THE INVENTION

1. Field of Art;

The present invention relates to a lithium battery including an amorphous cathode active material mainly composed of vanadium pentoxide ($V_2O_5$), which is small-sized and has a large charge-discharge capacity. More particularly, it relates to a rechargeable lithium battery comprising an anode active material made of metallic lithium or a lithium alloy, an amorphous cathode active material prepared by adding $V_2O_5$ with at least one metal oxide selected from the group consisting of $P_2O_5$, $TeO_2$, $GeO_2$, $Sb_2O_3$, $Bi_2O_3$ and $B_2O_3$ and/or at least one metal oxide selected from the group consisting of $MoO_3$ and $WO_3$, and an electrolyte.

2. Related Art Statement;

Many proposals have hitherto been made to provide a high energy density battery in which lithium is used as the anode active material. For example, a battery wherein an intercalation compound of grahite and fluorine is used as the cathode active material and metallic lithium is used as the anode active material has been known by the specification of U.S. Pat. No. 3,514,337. A lithium battery including graphite fluoride as the cathode active material and a lithium battery including manganese dioxide as the cathode active material have already been sold commercially. However, these known batteries are primary batteries which are not rechargeable.

The specification of U.S. Pat. No. 4,009,052 discloses secondary batteries wherein lithium is used as the anode active material and sulfides, selenides and tellurides of titanium, zirconium, hafnium, niobium, tantalum and vanadium are used as the cathode active material; and secondary batteries wherein lithium is used as the anode active material and chromium oxide or niobium selenide is used as the cathode active material are proposed by J. Electrochem. Soc., 124(7), 968 and 325, (1977). However, these batteries are not satisfactory in their performance characteristics and from the economical standpoint of view.

Lithium batteries having amorphous cathode active materials of $MoS_2$, $MoS_3$ and $V_2S_5$ are known by J. Electroanal. Chem. 118, 229 (1981), and lithium battery having an amorphous cathode active material of $LiV_3O_8$ is known by J. Non-Crystalline solids, 44, 297 (1981). However, these known batteries have problems in rate capability and are inferior in charge-discharge characteristics. The use of crystalline $V_2O_5$ as the cathode active material has been proposed by J. Electrochem. Soc. Meeting (Toronto, May 11 to 16, 1975, No. 27). However, the battery prepared in accordance with the proposal has a small capacity and is unsatisfactory in charge-discharge characteristics.

A solid solution of $V_2O_5$ and $P_2O_5$ is disclosed in Japanese Patent Laid-Open Publication No. 134561/1984 which was laid open to the public on Aug. 2, 1984. However, the solid solution was prepared by quenching the molten mass in air and had some problem in reproducibility of the performance characteristics of the battery using the same. Moreover, the solid solution was not fully amorphous since the quenching rate was low. French Patent Laid-Open Publication No. 2527842 (laid open to the public on Dec. 2, 1983) as well as DT-OS No. 3319987 (laid open to the public on Dec. 1, 1983) which are the publications of the patent application by Western Electric Company Incorporation, disclose a lithium cell comprising a nonaqueous electrolyte and a cathode made of a crystalline composite metal oxide material containing $V_2O_5$. A further known literature is a report by ourselves, which is published by Journal of the Electrochemical Society, vol. 132, No. 2, pp 512 to 513 (1985) under the title of "$V_2O_5$—$P_2O_5$ Glasses as Cathode for Lithium Secondary Battery".

OBJECT AND SUMMARY OF THE INVENTION

The principal object of this invention is to provide a lithium battery, which is small in size and yet has a large charge-discharge capacity, wherein a $V_2O_5$ base amorphous material is used as the cathode active material.

With the aforementioned object in view, the present invention provides a lithium battery comprising a cathode active material made of a $V_2O_5$ base amorphous material which is prepared by admixing $V_2O_5$ with at least one metal oxide which will be referred to as Network Former and is selected from the group consisting of $P_2O_5$, $TeO_2$, $GeO_2$, $Sb_2O_3$, $Bi_2O_3$ and $B_2O_3$ and/or with at least one metal oxide selected from the group consisting of $MoO_3$ and $WO_3$, followed by heating to melt the admixture and then quenching at a rate of $10^2$ to $10^5$ °C./sec, an anode active material made of lithium or an alloy thereof, and an electrolyte which is chemically stable to the cathode active material and the lithium anode and which allows the lithium ions to move therethrough to react electrochemically with the cathode active material.

The $V_2O_5$ base amorphous material which may be used in the present invention includes the following materials:

(a) Amorphous $V_2O_5$ material;

(b) Amorphous materials of $V_2O_5$+Network Former ($P_2O_5$, $TeO_2$, $GeO_2$, $Sb_2O_3$, $Bi_2O_3$, $B_2O_3$);

(c) Amorphous materials of $V_2O_5$+$MoO_3$ and/or $WO_3$; and (d) Amorphous materials of $V_2O_5$+$MoO_3$ and/or $WO_3$+Network Former ($P_2O_5$, $TeO_2$, $GeO_2$, $Sb_2O_3$, $Bi_2O_3$, $B_2O_3$).

These cathode active materials can be brought into an amorphous state.

BRIEF DESCRIPTION OF THE DRAWINGS

FIG. 2 shows the infrared absorption spectra of the crystalline $V_2O_5$ material and the amorphous $V_2O_5$—$P_2O_5$ material;

DESCRIPTION OF THE INVENTION

According to the present invention, a cathode for a lithium secondary battery is made of an amorphous metal oxide material containing $V_2O_5$ as a main ingredient. The amorphous regions of the $V_2O_5$ base metal oxides have been investigated to learn the science of materials. $V_2O_5$ may be brought into an amorphous state, and it is known that $V_2O_5$ may be more easily brought into an amorphous state by the addition of a so-called Network Former. After eager pursuits for the preparation of a $V_2O_5$ base amorphous material, it has been found that a $V_2O_5$ base amorphous material can be conveniently prepared by quenching the molten mass at a higher quenching rate while adopting the quenching at water temperature (Quenching Rate: $10^{2°}$ C./sec) or adopting the quenching through rollers (Quenching Rate: $10^{5°}$ C./sec) in lieu of the quenching at the room temperature. The present invention is accomplished on the basis of the aforementioned finding.

Figure 1:
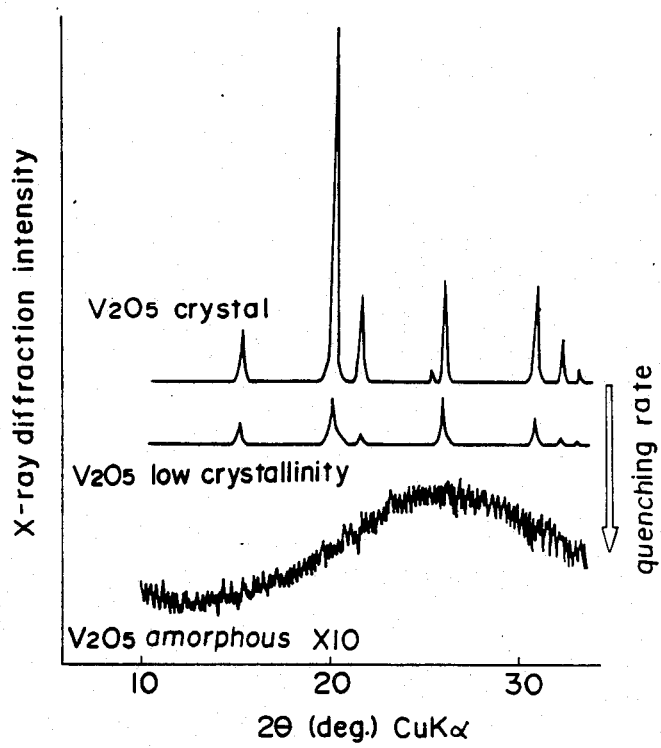
FIG. 1 is an X-ray diffraction intensity chart showing the effect of quenching rate on the formation of amorphous $V_2O_5$ phase.

FIG. 1 shows the X-ray diffraction pattern of pure $V_2O_5$ as the $V_2O_5$ is brought into an amorphous state. The arrow in the Figure shows the direction along which the quenching rate is increased. The pure $V_2O_5$ is not brought into an amorphous state by quenching in water, since the quenching rate is too low. The pure $V_2O_5$ can be brought into an amorphous state by super-high speed quenching through the twin roll quenching method.

FIG. 2 shows the infrared absorption spectra of $V_2O_5$—$P_2O_5$ systems. Referring to FIG. 2, the peaks indicating the double bond V═O and the weak V—O bonds along cleavage plane in crystalline $V_2O_5$ are broadened as each of the systems is gradually brought into amorphous state, showing that the system is changed to a random structure with the V—O bond lengths being widely distributed. As the amorphous 95 mol % $V_2O_5$—$P_2O_5$ system prepared by the addition of $P_2O_5$ is brought to an amorphous state, the peak indicating the double bond V═O is shifted to a lower wavenumber and the peaks indicating the V—O bonds are shifted to higher wavenumbers, which shows that the bond strengths of the V—O bonds are uniformalized. The numerals 90, 80, 70 and 60 attached to respective infrared absorption spectra indicate the contents of $V_2O_5$ by mol % in respective systems. It is expected that the excellent charge-discharge characteristics of an amorphous material are attributed to the isotropic property and the elasticity in structure of the amorphous material. On the contrary, in a crystalline $V_2O_5$ material, weak V—O bonds present at the two-dimensional layers, between which lithium ions can penetrate, are ruptured by the deep discharge to cause serious change in structure, whereby the reversibility in charge-discharge operations is deteriorated.

According to the present invention, $P_2O_5$ may be replaced by any one or more of metal oxides selected from the group consisting of $TeO_2$, $GeO_2$, $Sb_2O_3$, $Bi_2O_3$ and $B_2O_3$; and $V_2O_5$ added with one or more of the aforementioned metal oxides is heated to form a molten mass which is then quenched to prepare a $V_2O_5$ base amorphous material to be used as the cathode active material. Such a metal oxide is referred to as a Network Former, and may be added to $V_2O_5$ preferably in an amount of from 1 mol % to 40 mol %. If the amount of the added Network Former is less than 1 mol %, the electrical properties of the resultant product become equivalent to those of $V_2O_5$; whereas the electrical properties of the resultant product are deteriorated if the amount of the added Network Former is more than 40 mol %.

An amorphous material may be prepared by adding $V_2O_5$ with $MoO_3$ or $WO_3$, followed by heating to form a molten mass which is then quenched. The thus prepared amorphous material may be used in a lithium battery as a cathode active material, according to the invention. $MoO_3$ or $WO_3$ may be added preferably in an amount of from 10 to 95 mol %, more preferably from 25 to 75 mol %. If the amount of the added $MoO_3$ or $WO_3$ is less than 10 mol %, the electrical properties of the resultant product become equivalent to those of $V_2O_5$; whereas the electrical properties of the resultant product are deteriorated if the amount of the added $MoO_3$ or $WO_3$ is more than 95 mol %.

The $V_2O_5$ base amorphous cathode active material which may be used in a lithium battery as a cathode active material, according to the invention, may be prepared by adding $V_2O_5$ with a first additive of at least one metal oxide selected from the group consisting of $P_2O_5$, $TeO_2$, $GeO_2$, $Sb_2O_3$, $Bi_2O_3$ and $B_2O_3$ and a second additive of at least one metal oxide selected from the group consisting of $MoO_3$ and $WO_3$, followed by heating to form a molten mass of a ternary system which is then quenched. A preferred ternary $V_2O_5$ base amorphous cathode active material has a composition containing 1 to 40 mol % of the first additive and 1 to 25 mol % of the second additive. A composition out of the aforementioned preferred range is not suited for use as a cathode active material, since such a composition has not excellent electrical properties.

In order to prepare a cathode, the $V_2O_5$ base amorphous cathode active material of the invention is mixed with a binder powder, such as a powder of polytetrafluoroethylene, and applied on a nickel or stainless steel substrate to form a film. The amorphous material may be mixed with a powder of a conductor, such as acetylene black, to form a conductive mixture which is optionally added with a binder powder, such as a powder of polytetrafluoroethylene, and then the admixture is molded in a metal container or applied on a nickel or stainless steel substrate to form a film.

An anode may be prepared by extending lithium or a lithium alloy to form a sheet, similar to an ordinary lithium battery, or the thus prepared sheet may be applied under pressure over a conductive net of nickel or stainless steel.

Any of the known electrolytes generally used in batteries wherein lithium are used as the anode active materials may be used as an electrolyte in the battery of the invention, the examples being combinations of one or more aprotic solvents, such as propylene carbonate (PC), 2-methyltetrahydrofuran (2Me-THF), dioxolane (DOL), tetrahydrofuran (THF), 1, 2-dimethoxyethane (DME), ethylene carbonate (EC), γ-butyrolactone (BL), dimethyl sulfoxide (DMSO), acetonitrile (AN), formamide (FA), dimethylformamide (DMF) and nitromethane (NM), with a lithium salt, such as $LiClO_4$, $LiAlCl_4$, $LiBF_4$, $LiCl$, $LiPF_6$ $LiSbF_6$ and $LiAsF_6$, and solid electrolytes or molten salts containing $Li^+$ ions acting as conductors.

A thin diaphragm of porous polypropylene or like materials may be incorporated in the battery as a microporous separator.

Figure 3:
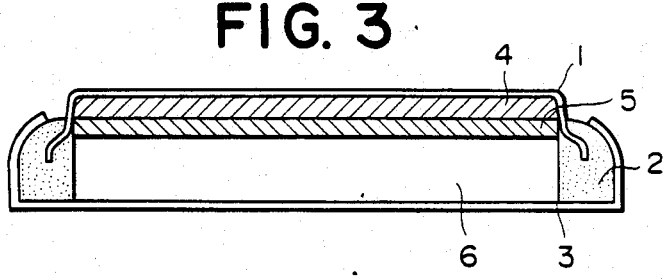
FIG. 3 is a sectional view showing the structure of an embodiment of the battery of the invention.

FIG. 3 is a sectional view showing a coin-shaped battery embodying the invention, which comprise a stainless steel cap 1, a polypropylene gasket 2, a stainless steel cathode case 3, a lithium anode 4, a polypropylene separator 5 and a cathode mixture pellet 6.

A cap 1 having an interior face applied with an anode 4 of metallic lithium was assembled with a gasket 2 with the peripheral wall being thrusted into the gasket, and a separator 5 and a cathode mixture pellet 6 were subsequently placed over the lithium anode 4 to be filled in the open recess of the assembled cap and gasket. An appropriate amount of 1N-LiClO$_4$/PC+DME (1 to 1 by volume; i.e. a mixed solvent composed of equivalent volumes of propylene carbonate and 1, 2-dimethoxyethane) was poured to be impregnated into the cathode mixture pellet and separator for acting as an electrolyte, and then a cathode case 3 was placed over the assembly followed by crimping to prepare a con-shaped battery having a diameter of 23 mm and a thickness of 2 mm.

In preparation of the cathode mixture pellet 6, an amorphous material (contained 5 to 40 mol % of P$_2$O$_5$) acting as the cathode active material, ketjen black EC and polytetrafluoroethylene were mixed in a ratio by weight of 70:25:5 in a grinding mixer. The mixture was molded by passing the same through rollers to from a sheet having a thickness of 0.6 mm, and a disk-shaped cathode (2 cm$^2$) having a diameter of 16 mm was punched from the sheet.

Figure 4:
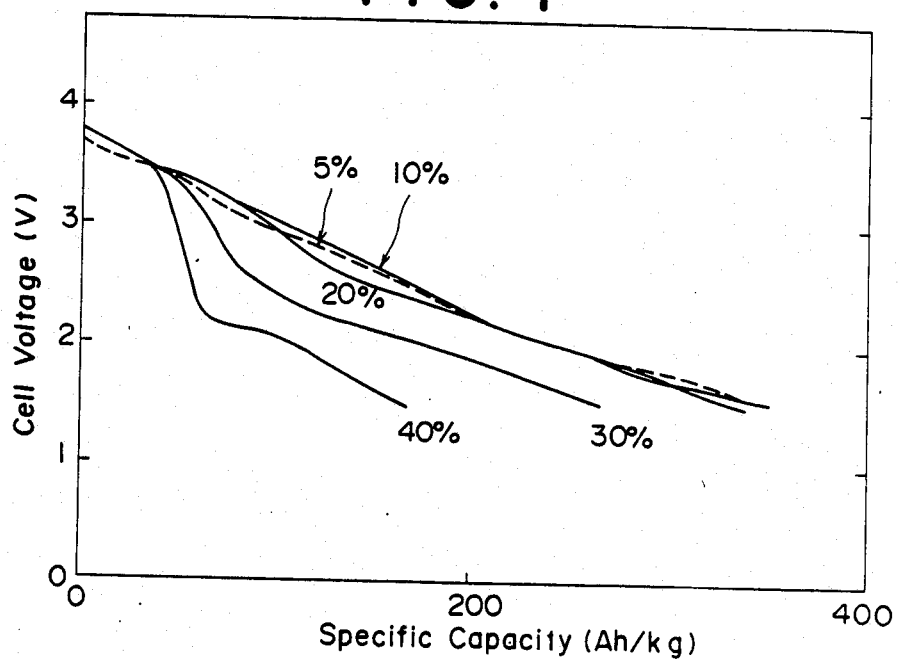
FIG. 4 is a chart showing the change in discharge voltage profiles of amorphous $V_2O_5$—$P_2O_5$ systems as the mixing ratio of $P_2O_5$ is varied.

FIG. 4 shows the discharge voltage profiles of lithium batteries embodying the invention and having cathodes made of V$_2$O$_5$—P$_2$O$_5$ amorphous materials, the content of P$_2$O$_5$ being varied, respectively to 5%, 10%, 20%, 30% and 40%. As seen from FIG. 4, if the content of P$_2$O$_5$ exceeds 20%, a Knee appears in the profile with attendant reduction in discharge voltage of the battery and attendant reduction in discharge capacity. Accordingly, it is preferred that the content of P$_2$O$_5$ is within 5% to 20% for the preparation of a battery having satisfactory discharge characteristics.

Figure 5:
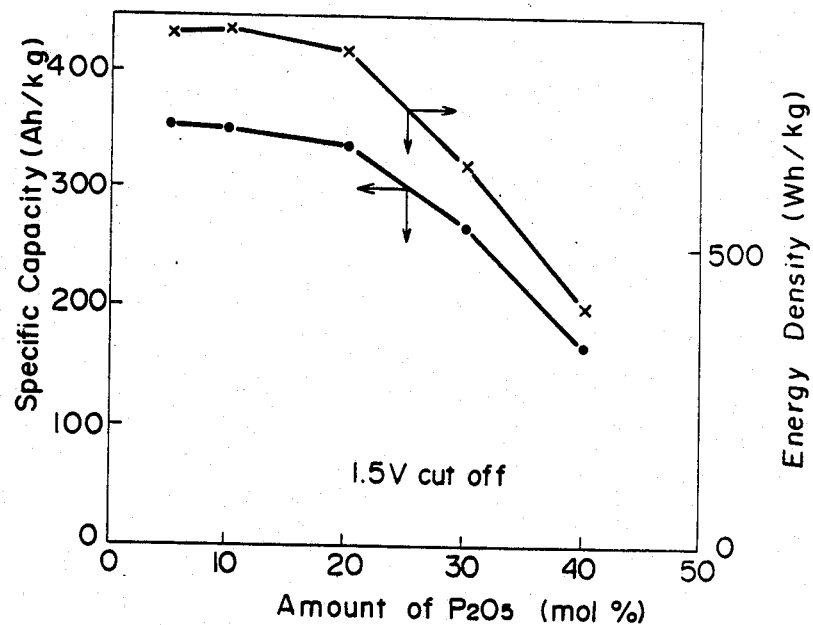
FIG. 5 is a chart showing the change in discharge characteristics of amorphous $V_2O_5$—$P_2O_5$ systems as the mixing ratio of $P_2O_5$ is varied.

FIG. 5 shows the changes in specific capacity and energy density in terms of the change in content of P$_2$O$_5$ in the V$_2$O$_5$—P$_2$O$_5$ system amorphous cathode, at 1.5 V cut off. When the content of P$_2$O$_5$ is small, superior discharge characteristics are shown such that the specific capacity is ca. 350 Ah/kg and the energy density is ca. 900 Wh/kg.

Figure 6:
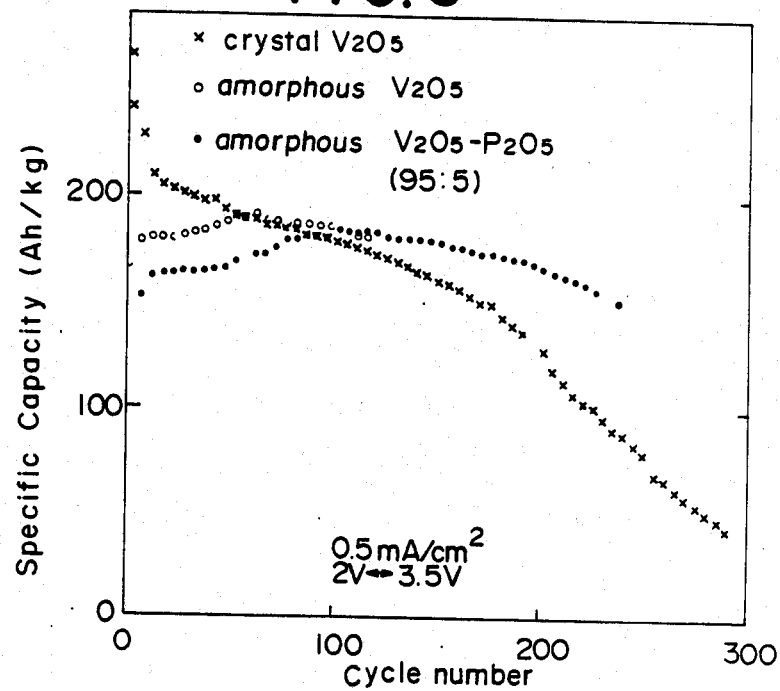
FIG. 6 is a chart showing the cycle life performances of crystalline and amorphous $V_2O_5$ materials and the cycle life performance of an amorphous $V_2O_5$—$P_2O_5$ system.

FIG. 6 shows the charge-discharge characteristics of the lithium batteries wherein amorphous V$_2$O$_5$ and amorphous V$_2$O$_5$—P$_2$O$_5$ are used as the cathode active materials, while comparing with the characteristic of a lithium battery wherein crystalline V$_2$O$_5$ is used. In the Figure, the plots X is used for the crystalline V$_2$O$_5$, the plots O for the amorphous V$_2$O$_5$ and the plots ● for the amorphous V$_2$O$_5$—P$_2$O$_5$ (95:5 by mol %). The specific capacity (Ah/kg) per a unit weight of each of the cathode materials in terms of the cycle number was measured at a constant current density of 0.5 mA/cm$^2$ and under a voltage control of 2.0 to 3.5 volts. As will be apparent from the Figure, the crystalline V$_2$O$_5$ is scarcely applicable to practical uses, since the charge-discharge capacity is gradually reduced as the repeated charge-dishcarge cycle number increases in case where the crystalline V$_2$O$_5$ is used. On the contrary, such a tendency is not found so that satisfactory charge-discharge characteristics are preserved when amorphous or noncrystal materials are used. It is seen that the capacity is gradually reduced, and the reduction rate of the capacity is increased after the cycle number exceeds 200, due to deterioration of the anode.

Figure 7:
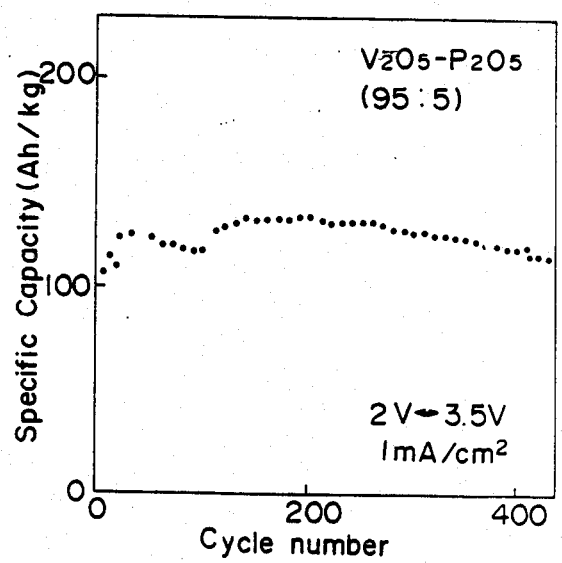
FIG. 7 is a chart showing the extended cycling performance of an amorphous $V_2O_5$—$P_2O_5$ system.

FIG. 7 shows the extended cycling performance of a cathode active material made of an amorphous V$_2$O$_5$—P$_2$O$_5$ (95:5 by mol %) when each charge-discharge cycle operation is effected at a constant current density of 1 mA/cm$^2$ and under a voltage control of 2 to 3.5 volts. The result reveals that more than 300 charge-discharge cycles can be repeated.

Figure 8:
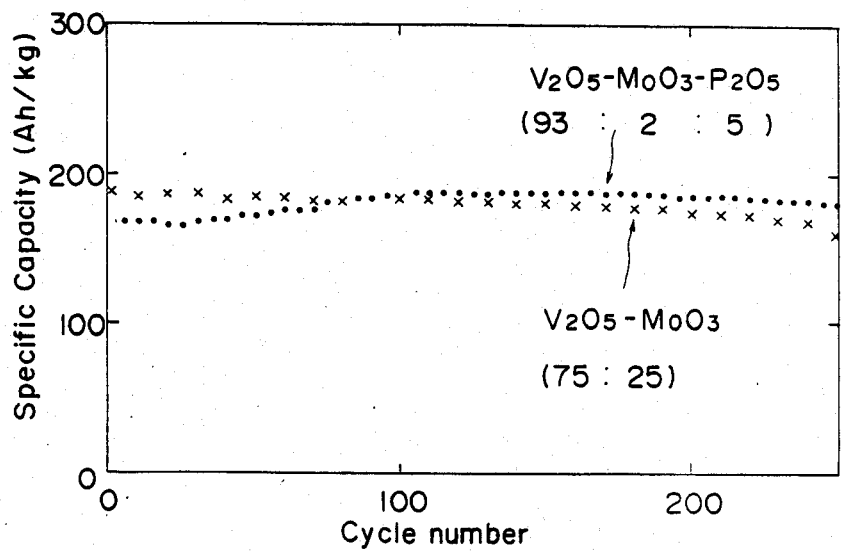
FIG. 8 is a chart showing the cycle life performances of cathodes made of an amorphous $V_2O_5$—$MoO_3$—$P_2O_5$ system and an amorphous $V_2O_5$—$MoO_3$.

FIG. 8 shows the extended cycling performances of lithium secondary batteries wherein an amorphous V$_2$O$_5$—P$_2$O$_5$—MoO$_3$ (95:5:2 by mol %) material and an amorphous V$_2$O$_5$—MoO$_3$ (75:25 by mol %) material are used as the cathode active materials. The results show stable charge-recharge performance characteristics for repeated cycles.

A lithium battery is prepared by using an amorphous V$_2$O$_5$—P$_2$O$_5$ (95:5 by mol %) material as the cathode active material, and the battery is subjected to repeated charge-discharge cycles at a constant current of 2 mA. One charge-discharge cycle comprises a discharge operation ofr 7 hours, a rest time of an hour, a charge operation for 7 hours and a rest time of an hour. This cycle corresponds to a charge-discharge depth of about 40% (a charge-discharge capacity of ca. 150 Ah/kg per a unit weight of the cathode active material).

Figure 9:
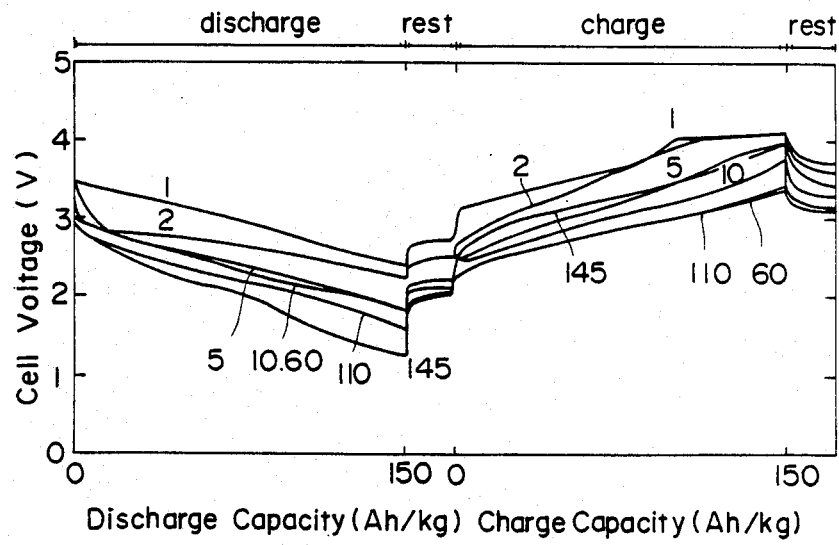
FIG. 9 is a chart showing the cycling behavior of a cathode made of an amorphous $V_2O_5$—$P_2O_5$ system.

FIG. 9 show the results of repeated charge-discharge cycles. The numerals attached to the curves in the Figure indicate the charge-discharge cycle numbers. As seen, the results after the fifth cycle show remarkably improved reversibility, and more than 145 charge-discharge cycles may be repeated with satisfactory charge-recharge performance characteristics.

It is not made clear why the binary and ternary amorphous cathode active materials mainly composed of V$_2$O$_5$ and provided by the invention exhibit superior charge-discharge performance characteristics. However, it is estimated that one reason therefore resides in the fact that the cathode active material, according to the invention, is amorphous in its entirety as shown by the results of X-ray diffraction pattern and infrared absorption spectrum.

As to the ternary cathode active material, prepared in accordance with the present invention, it is considered that the first additive selected from the group consisting of P$_2$O$_5$, TeO$_2$, GeO$_2$, Sb$_2$O$_3$, Bi$_2$O$_3$ and B$_2$O$_3$ forms together with the V$_2$O$_5$ a somewhat extensible bond network to allow easier passage of lithium ions through the cathode active material at the charge and discharge steps and to prevent the structure of cathode active material from being ruptured or broken by repeated passage of the lithium ions. It is also considered that the second additive selected from the group consisting of MoO$_3$ and WO$_3$ acts to control the elasticity of the network and to adjust the spacings of the bonds, whereby the passage of lithium ions is further facilitated.

As should be appreciated from the foregoing, a battery comprising the V$_2$O$_5$ base amorphous cathode active material, the metallic lithium anode and an electrolyte, according to the present invention, has a discharge voltage of about 3 volts and a large discharge capacity which is comparative to the discharge capacity of an Ni-Cd battery, so that the energy density of the battery of the invention can be increased to more than two times as that of the Ni-Cd battery.

The present invention will now be described more specifically with reference to Examples thereof.

EXAMPLE 1

An amorphous material was prepared through the twin roll quenching process. $V_2O_5$ was charged in a quarz nozzle having a tip end provided with a small pore having a diameter of 0.3 mm$\phi$, and heated by an external silicon carbide heater to melt the $V_2O_5$. After the host material has been melted completely, the nozzle was neared to vicinity of the interface of paired rollers by the action of an air-piston provided at the upper end of the quarz nozzle, and at the same time the pressure in the nozzle was increased abruptly by the introduced argon gas to a pressure of 2 kg/cm$^2$ to inject the molten mass from the nozzle pore in-between the roller pair rotating at a high speed of 2000 to 4000 rpm. Whereupon, the molten mass was quenched and solidified extremely rapidly to form a thin web of amorphous $V_2O_5$. The structure of thus solidified $V_2O_5$ was inspected through the X-ray diffractometry to ascertain that it was in an amorphous state. The X-ray diffraction pattern of the thus prepared amorphous $V_2O_5$ is shown in FIG. 1. The chart shows an amorphous pattern when analysed through the X-ray diffractometry using the CuK $\alpha$ ray, the pattern having a broad peak at approximately $2\theta \simeq 26°$ to indicate that the structure is amorphous.

A cathode mixture pellet was then molded for manufacturing a coin-shaped battery shown in FIG. 3. The amorphous $V_2O_5$, ketjen black EC and polyfluoroethylene were mixed together in a ratio by weight of 70:25:5 and mixed in a grinding mixer to prepare a mixture which was molded through rollers to form a 0.6 mm thick sheet. A disk-shaped cathode having a diameter of 16 mm and an are of 2 cm$^2$ was punched from the sheet.

Using an electrolyte made of 1.5N LiAsF$_6$/2 MeTHF, a lithium battery was prepared. The thus prepared battery was tested by discharging at a constant current of 2 mA and 4 mA, respectively. The results are shown in Table 1.

TABLE 1

| Discharge Current (mA) | 2 V Cut Off | | 1.5 V Cut Off | |
|---|---|---|---|---|
| | Average Voltage (volt) | Energy Density (Wh/kg) | Average Voltage (volt) | Energy Density (Wh/kg) |
| 2 | 2.68 | 650 | 2.38 | 860 |
| 4 | 2.65 | 560 | 2.36 | 730 |

Then the battery was subjected to repeated charge-discharge cycles at a constant current of 1 mA. One cycle of the charge-discharge operations included a discharge for 16 hours, a rest for an hour, a charge for 16 hours and a rest for an hour. The cycle corresponds to a charge-discharge depth of about 40% (a charge-discharge capacity of about 150 Ah/kg, based on a unit weight of the cathode active material).

The result of the charge-discharge cycle test revealed that the reversibility of the battery after the fifth cycle was excellent and that the battery was sustainable for charge-discharge cycles of more than 130 times with satisfactory charge-discharge performance characteristics.

The battery was then subjected to voltage controlled charge-discharge cycles between a voltage range of 2 volts and 3.5 volts at a constant current of 1 mA. The interrelation between the charge-discharge cycle number and the discharge capacity was checked to find that the charge-discharge capacity was stabilized approximately after the tenth cycle while having a charge-discharge capacity of about 180 Ah/kg, based on the weight of the cathode active material, the stabilized cycle operation being continued after 95 cycles.

EXAMPLE 2

$V_2O_5$ was mixed with $MoO_3$, the added quantities of $MoO_3$ being varied, and the molten masses maintained at about 800° C. were quenched rapidly through the twin roll quenching process similarly as in Example 1 to prepare $V_2O_5$—$MoO_3$ system amorphous materials having different compositions. The results of X-ray diffractometry conducted while using the CuK $\alpha$ ray of respective compositions gave amorphous patterns each having a broad peak at the vicinity of $2\theta \simeq 26°$.

Each of the thus prepared $V_2O_5$—$MoO_3$ system amorphous materials was pulverized using a crushing mixer for about 80 minutes. The pulverized material was then mix-d with ketjen black and polytetrafluoroethylene in a mixing ratio of 70:25:5 by weight, and the mixture was extended and molded through rollers to form a 0.5 mm thick sheet from which a 16 mm diameter cathode mixture pellet was prepared.

Using 1N LiClO$_4$/PC-DME as the electrolyte, a lithium secondary battery was prepared, which was subjected to a constant current discharge test at 1 mA. The discharge performance characteristics found are shown in Table 2. Meanwhile, the discharge was terminated at a voltage of 2 volts.

TABLE 2

| $V_2O_5$—$MoO_3$ System Amorphous Materials | | | | |
|---|---|---|---|---|
| Molar Ratio of $V_2O_5$ (mol %) | 100 | 75 | 50 | 0 |
| Average Voltage (volt) | 2.7 | 2.7 | 2.63 | 2.33 |
| Energy Density (Wh/kg) | 660 | 520 | 540 | 420 |

The following Table 3 shows the representative results of the charge-discharge performance characteristics (cycle numbers) during the repeated charge-discharge cycles conducted at a constant current of 1 mA and a capacity of 150 Ah/kg, based on the weight of the cathdoe active material

TABLE 3

| $V_2O_5$—$MoO_3$ System Amorphous Materials | | |
|---|---|---|
| Ratio of $V_2O_5$ in Cathode Active Material (mol %) | Electrolyte | |
| | 1 N LiClO$_4$/PC—DME | 1.5 N LiAsF$_6$/2 Me—THF |
| 100 | 47 | 132 |
| 75 | 49 | 122 |
| 50 | 62 | 163 |
| 0 | 40 | 105 |

The $V_2O_5$—$MoO_3$ system amorphous materials containing $V_2O_5$ in a ratio of 30 to 75 mol % exhibited particularly preferred charge-discharge performance characteristics.

A battery having a cathode active material made of a 50 mol % $V_2O_5$—$MoO_3$ and an electrolyte of 1.5N LiAsF$_6$/2 Me-IHF was subjected to repeated charge-discharge cycles at a constant current of 1 mA under a voltage control of between 2 and 3.5 volts, whereby a cycling behavior similar to that shown in FIG. 8 was observed. The initial discharge capacity was so large as 200 Ah/kg, and the capacity was maintained above the level of 150 Ah/kg until 120 cycles.

The aforementioned lithium secondary battery was discharged, respectively, at a constant current of 1 mA (0.5 mA/cm$^2$). 2 mA (1 mA/cm$^2$) and 4 mA (2 mA/cm$^2$) to reveal that the reduction in utilization efficiency of the cathode material was little to show high capacity maintenance rate even if it was discharged at a high current rate. Supposing that the cathode utilization efficiency at the discharge rate of 1 mA (0.5 mA/cm$^2$) as 100%, the cathode utilization efficiency at the discharge rate of 4 mA (2 mA/cm$^2$) was 75% when the discharge was terminated at 2 volts.

Similar amorphous materials were obtained by adding V$_2$O$_5$ with WO$_3$ in lieu of MoO$_3$, W being a transition metal belonging to the Group VI of the Periodic Table similar to Mo, and the best performance characteristics were obtained when the compositions containing V$_2$O$_5$ in the range of about 50 mol % were used in the batteries.

A lithium secondary battery was prepared generally in accordance with the procedures for preparing the secondary battery comprising the V$_2$O$_5$—MoO$_3$ system amorphous cathode active material, except in that an amorphous material of 50 mol % V$_2$O$_5$—50 mol % WO$_3$ was used as the cathode active material. The battery was subjected to repeated charge-discharge cycle at a constant current of 1 mA and at a capacity of 160 Ah/kg to obtain the cycling behavior similar to that shown in FIG. 9. Although the V$_2$O$_5$—WO$_3$ system is inferior in flatness of the charge-discharge profile as compared to that of the V$_2$O$_5$—MoO$_3$ system, the both systems are equivalent in cycle life.

EXAMPLE 3

A predetermined quantity of P$_2$O$_5$ was mixed with V$_2$O$_5$ and the mixture was melted at 750° C. for an hour in a platinum crucible, and then dipping the platinum crucible in water to prepare a V$_2$O$_5$—P$_2$O$_5$ system amorphous material. The thus prepared material was inspected through the X-ray diffractometry to ascertain that it was in an amorphous state. The X-ray diffraction pattern of the amorphous material having a composition of 95 mol % V$_2$O$_5$—5 mol % P$_2$O$_5$ was an amorphous pattern only having an extremely broad peak at the vicinity of $2\theta \approx 26°$ when the CuK $\alpha$ ray was used to reveal that the system is in an amorphous state.

The amorphous material was prepared through the twin roll quenching, as described in Example 1, by which the molten mass could be quenched at a rate higher than that obtainable by quenching in water, whereby a similar result was obtained. Other quenching means, such as a splat cooling, may be adopted.

Lithium batteries similar to that shown in FIG. 3 were manufactured using the V$_2$O$_5$—P$_2$O$_5$ system amorphous material as the cathode active materials. A 1N LiClO$_4$/PC+DME (1:1 by volume) was used as the electrolyte. The batteries were subjected to discharge tests at a constant current of 1 mA. FIG. 4 shows the changes in discharge voltages (V) of respective batteries in terms of the change in specific capacity (Ah/kg) as the ratio of the added P$_2$O$_5$ was varied; whereas FIG. 5 shows the changes in specific capacities (Ah/kg) and the changes in energy densities (Wh/kg) of respective batteries in terms of the ratio of added P$_2$O$_5$ (mol %). The numerals (%) in FIG. 5 indicate the ratio of added P$_2$O$_5$.

If the ratio of added P$_2$O$_5$ exceeds 20 mol %, the voltage profile is abruptly changed as shown in FIG. 4, and the specific capacity as well as the energy density are lowered as shown in FIG. 5. It is preferred that the mixing ratio of P$_2$O$_5$ is not more than 30 mol % in order to prepare a battery having excellent performance characteristics.

A lithium battery similar to that shown in FIG. 3 was prepared while using an amorphous material composed of 95 mol % V$_2$O$_5$—5 mol % P$_2$O$_5$ as a cathode active material. The results of discharge tests conducted, respectively, at a constant current of 1 mA (0.5 mA/cm$^2$) and 10 mA (5 mA/cm$^2$) are shown in Table 4.

TABLE 4

| Discharge Current (mA) | 2 V Cut Off | | 1.5 V Cut Off | |
|---|---|---|---|---|
| | Average Voltage (volt) | Energy Density (Wh/kg) | Average Voltage (volt) | Energy Density (Wh/kg) |
| 1 | 2.80 | 669.7 | 2.46 | 868.2 |
| 10 | 2.62 | 439.7 | 2.25 | 653.7 |

The reduction in utilization efficiency of the cathode material was little and showed high rate capability, in that the cathode utilization efficiency at the discharge rate of 10 mA (5 mA/cm$^2$) was 82% when it was supposed that the cathode utilization efficiency at the discharge rate of 1 mA (0.5 mA/cm$^2$) was 100%. It had been ascertained that similar high current discharges could be realized from the batteries wherein amorphous materials of the same system having different compositions were used.

Another lithium battery was prepared, generally following to the similar procedures as in the preparation of the battery described above, except in that a 1.5N LiAsF$_6$/2 Me-THF was used as the electrolyte. The battery was discharged at a constant current, respectively, of 2 mA and 4 mA, whreby the results shown in Table 5 were obtained.

TABLE 5

| | V$_2$O$_5$—P$_2$O$_5$ System Amorphous Material | | | |
|---|---|---|---|---|
| | 2 V Cut off | | 1.5 V Cut Off | |
| Discharge Current (mA) | Average Voltage (volt) | Energy Density (Wh/kg) | Average Voltage (volt) | Energy Density (Wh/kg) |
| 2 | 2.67 | 642.3 | 2.37 | 844.0 |
| 4 | 2.64 | 549.1 | 2.35 | 721.6 |

The battery was then subjected to repeated charge-discharge cycles at a constant current of 2 mA. One cycle of the charge-discharge operations included a discharge for 7 hours, a rest for an hour, a charge for 7 hours and a rest for an hour. The cycle corresponds to a charge-discharge depth of about 40% (a charge-discharge capacity of about 150 Ah/kg, based on a unit weight of the cathode active material). The results are shown in FIG. 9. The numerals in the Figure indicate the charge-discharge cycle numbers. The reversibility of the battery after the fifth cycle was excellent, and the battery was sustainable for chage-discharge cycles of more than 145 times with satisfactory charge-discharge performance characteristics.

The battery was then subjected to voltage-controlled charge-discharge cycles between a voltage range of 2 volts and 3.5 volts at a constant current of 1 mA. The interrelation between the charge-discharge cycle number and the specific capacity is plotted by the mark ● in FIG. 6. As shown, the charge-discharge capacity was stabilized approximately after the tenth cycle while having a charge-discharge capacity of about 180

Ah/kg, based on the weight of the cathode active material, the charge-discharge capacity being on a relatively flat curve even at the 200th cycle.

EXAMPLE 4

A cathode active material was prepared by mixing $V_2O_5$ with a predetermined quantity of at least one metal oxide selected from $TeO_2$, $GeO_2$, $Sb_2O_3$, $Bi_2O_3$ and $B_2O_3$, heating the mixture in a platinum crucible at 750° C. for 2 hours, and then dipping the platinum crucible in water to quench the molten mixture.

Coin-shaped batteries similar to that shown in FIG. 3 were fabricated, using 1N $LiClO_4$/PC+DME (a mixed solvent of propylene carbonate and 1,2-dimethoxyethane mixed in a ratio of 1:1 by volume) or 1N $LiAsF_6$/2 Me-THF (2-methyl tetrahydrofuran) as the electrolytes.

The thus fabricated batteries were subjected to repeated charge-discharge cycles at a constant current of 1 mA and at a capacity of 150 Ah/kg, based on the weight of the cathode active material. The results are shown in Table 6.

TABLE 6

Charge-Discharge Cycle Performance Characteristics (Cycle Number) at 1 mA charge-Discharge of $V_2O_5$—$TeO_2$ System Amorphous Material

| Ratio of $TeO_2$ in Cathode Active Material (mol %) | Electrolyte | |
|---|---|---|
| | 1 N $LiClO_4$/PC—DME | 1.5 N $LiAsF_6$/ 2 Me—THF |
| 50 | 35 | 69 |
| 40 | 46 | 92 |
| 30 | 48 | 120 |
| 20 | 59 | 140 |
| 10 | 53 | 184 |
| 5 | 55 | 161 |
| 1 | 51 | 135 |
| 0 | 47 | 132 |

As will be seen from the results set forth in the preceding Table, the melted and then quenched products of $V_2O_5$-$TeO_2$ containing 1 to 40 mol % of $TeO_2$ are superior over those containing more than 50 mol % of $TeO_2$ in their charge-discharge performance characteristics.

Generally following to the procedures as described above, except in that 1 to 40 mol % of $GeO_2$ was added to $V_2O_5$ in lieu of $TeO_2$, $V_2O_5$—$GeO_2$ system amorphous materials were prepared. Cathode mixture pellets were prepared from the thus obtained $V_2O_5$—$GeO_2$ system amorphous materials, and then coin-shaped lithium batteries each having the structure as shown in FIG. 3 were fabricated.

Using both of 1N $LiClO_4$/PC-DME and 1.5N $LiAsF_6$/2 Me-THF as the electrolytes, lithium batteries were prepared according to the invention, and the batteries were subjected to repeated charge-discharge cycle tests at 1 mA and at 150 Ah/kg. The results are shown in Table 7.

TABLE 7

Charge-Discharge Cycle Performance Characteristics at 1 mA Charge-Discharge (Cycle Number) of $V_2O_5$—$GeO_2$ System Amorphous Material

| Ratio of $GeO_2$ in Cathode Active Material (mol %) | Electrolyte | |
|---|---|---|
| | 1 N $LiClO_4$/PC—DME | 1.5 N $LiAsF_6$/ 2 Me—THF |
| 50 | 48 | 96 |
| 30 | 51 | 120 |
| 20 | 56 | 142 |
| 10 | 54 | 139 |

TABLE 7-continued

Charge-Discharge Cycle Performance Characteristics at 1 mA Charge-Discharge (Cycle Number) of $V_2O_5$—$GeO_2$ System Amorphous Material

| Ratio of $GeO_2$ in Cathode Active Material (mol %) | Electrolyte | |
|---|---|---|
| | 1 N $LiClO_4$/PC—DME | 1.5 N $LiAsF_6$/ 2 Me—THF |
| 1 | 54 | 125 |

As seen from the results set forth in Table 7, the lithium batteries using the compositions of Table 7 as the cathode active materials are sustainable for about 50 cycle charge-discharge operations when combined with 1N $LiClO_4$/PC-DME electrolyte and for more than 100 cycle charge-discharge operations when combined with 1.5N $LiAsF_6$/2 Me-THF electrolyte.

An amorphous cathode active material was prepared by mixing $V_2O_5$ with one metal oxide selected from $Sb_2O_3$, $Bi_2O_3$ and $B_2O_3$ in a mixing ratio such that $V_2O_5$ occupied 60 to 99 wt % of the mixture, followed by melting and subsequent quenching of the mixture. A cathode mixture pellet was prepared from the thus obtained cathode active material, and then a coin-shaped battery was fabricated using the pellet. Similar batteries were prepared by changing the kind of used metal oxide and/or varying the mixing ratio of the metal oxide, and the batteries were subjected to repeated chargedischarge cycle tests at 1 mA and at 150 Ah/kg. The results are shown in Table 8.

TABLE 8

Charge-Discharge Cycle Performance Characteristics (Cycle Number) When Subjected to Repeated Charge-Discharge Cycles at 1 mA and 150 Ah/kg

| Cathode Active Material | 1 N $LiClO_4$/PC—DME | 1.5 N $LiAsF_6$/ 2 Me—THF |
|---|---|---|
| $V_2O_5$ (60)-$Sb_2O_3$ (40) | 47 | 95 |
| $V_2O_5$ (99)-$Sb_2O_3$ (1) | 49 | 99 |
| $V_2O_5$ (60)-$Bi_2O_3$ (40) | 47 | 99 |
| $V_2O_5$ (99)-$Bi_2O_3$ (1) | 48 | 98 |
| $V_2O_5$ (60)-$B_2O_3$ (40) | 48 | 98 |
| $V_2O_5$ (99)-$B_2O_3$ (1) | 48 | 99 |

An amorphous cathode active material was prepared by mixing $V_2O_5$ with $TeO_2$ or $GeO_2$ and one metal oxide selected from $Sb_2O_3$, $Bi_2O_3$ and $B_2O_3$ in a mixing ratio of 7:2:1, followed by melting and subsequent quenching of the mixture. A cathode mixture pellet was prepared from the thus obtained cathode active material, and then a coin-shaped battery was fabricated using the pellet. Similar batteries were prepared by changing the kind of used metal oxide and/or varying the mixing ratio of the metal oxide, and the batteries were subjected to repeated charge-discharge cycle tests at 1 mA and at 150 Ah/kg. The results are shown in Table 9.

TABLE 9

Charge-Discharge Cycle Performance Characteristics (Cycle Number) When Subjected to Repeated Charge-Discharge Cycles at 1 mA and 150 Ah/kg

| Cathode Active Material | 1 N $LiClO_4$/PC—DME | 1.5 N $LiAsF_6$/ 2 Me—THF |
|---|---|---|
| $V_2O_5$—$TeO_2$—$Sb_2O_3$ | 56 | 160 |
| $V_2O_5$—$TeO_2$—$Bi_2O_3$ | 57 | 182 |
| $V_2O_5$—$TeO_2$—$B_2O_3$ | 55 | 163 |
| $V_2O_5$—$GeO_2$—$Sb_2O_3$ | 51 | 132 |
| $V_2O_5$—$GeO_2$—$Bi_2O_3$ | 52 | 145 |
| $V_2O_5$—$GeO_2$—$B_2O_3$ | 55 | 146 |

As seen from the results set forth in Table 9, the lithium batteries have satisfactory charge-discharge performance characteristics.

EXAMPLE 5

$V_2O_5$ was mixed with a first additive selected from $P_2O_5$, $TeO_2$, $GeO_2$, $Sb_2O_3$, $Bi_2O_3$ and $B_2O_3$, and further added with a second additive selected from $MoO_3$ and $WO_3$ in a predetermined mixing ratio to obtain a mixture which was put into a platinum crucible. The platinum crucible was placed in an electric furnace to heat the content therein at 750° C. for 2 hour, and then the crucible was put into water for rapid quenching to prepare a cathode active material.

The thus prepared cathode actove material was pulverized by processing the same in a mixing crusher for 70 minutes, and then mixed with ketjen black and polytetrafluoroethylene in a mixing ratio of 70:25:5. The powder mixture was extended by means of rollers to mold a 0.5 mm thick sheet from which a cathode mixture pellet having a diameter of 16 mm was punched out. A coin-shaped battery was fabricated using the pellet. Similar battieres were prepared by changing the used metal oxides and/or varying the mixing ratio of the metal oxides, and the batteries were subjected to repeated charge-discharge cycle tests at 1 mA and at 140 Ah/kg. The results are shown in Table 10.

TABLE 10

Charge-Discharge Cycle Performance Characteristics (Cycle Number) When Subjected to Repeated Charge-Discharge Cycles at 1 mA and 140 Ah/kg

| Cathode Active Material | | Electrolyte | |
|---|---|---|---|
| Composition | Mixing Ratio by mole | 1 N LiClO$_4$/ PC—DME | 1.5 N LiAsF$_6$/ 2 Me—THF |
| $V_2O_5$—$TeO_2$—$WO_3$ | 98:1:1 | 51 | 120 |
| | 90:5:5 | 54 | 142 |
| | 70:20:10 | 56 | 163 |
| | 60:39:1 | 53 | 181 |
| | 74:1:25 | 51 | 145 |
| $V_2O_5$—$TeO_2$—$MoO_3$ | 98:1:1 | 49 | 124 |
| | 90:5:5 | 53 | 138 |
| | 70:20:10 | 60 | 152 |
| | 60:39:1 | 51 | 142 |
| | 74:1:25 | 50 | 131 |

As seen from the results set forth above, the batteries prepared by using the amorphous cathode active materials set forth in Table 10 have excellent charge-discharge performance characteristics.

A cathode active material was prepared by mixing $V_2O_5$ with a predetermined amount of $GeO_2$ and a predetermined amount of $WO_3$ or $MoO_3$, followed by melting and subsequent quenching. A cathode mixture pellet was molded from the thus prepared cathode active material, and then a coin-shaped lithium battery was fabricated. Similarly, lithium batteries were prepared by varying the mixing ratio of $V_2O_5$, $GeO_2$ and $WO_3$ or $MoO_3$, and they were subjected to repeated charge-discharge tests at 1 mA and at 140 Ah/kg. The results are shown in Table 11.

TABLE 11

Charge-Discharge Cycle Performance Characteristics (Cycle Number) When Subjected to Repeated Charge-Discharge Cycles at 1 mA and at 140 Ah/kg

| Cathode Active Material | | Electrolyte | |
|---|---|---|---|
| Composition | Mixing Ratio by mole | 1 N LiClO$_4$/ PC—DME | 1.5 N LiAsF$_6$/ 2 Me—THF |
| $V_2O_5$—$GeO_2$—$WO_3$ | 98:1:1 | 50 | 105 |
| | 90:5:5 | 51 | 142 |
| | 70:20:10 | 53 | 120 |
| | 60:39:1 | 50 | 132 |
| | 74:1:25 | 49 | 122 |
| $V_2O_5$—$GeO_2$—$MoO_3$ | 98:1:1 | 49 | 102 |
| | 90:5:5 | 53 | 143 |
| | 70:20:10 | 56 | 152 |
| | 60:39:1 | 54 | 141 |
| | 74:1:25 | 49 | 130 |

As seen, the batteries prepared by using the cathode active materials set forth in Table 11 have excellent charage-discharge performance characteristics.

A cathode active material was prepared by mixing $V_2O_5$ with a predetermined amount of $P_2O_5$ and a predetermined amount of $WO_3$ or $MoO_3$, followed by melting and subsequent quenching. A cathode mixture pellet was molded from thus prepared cathode active material, and then a coin-shaped lithium battery was fabricated. Similarly, lithium batteries were prepared by varying the mixing ratio of $V_2O_5$, $P_2O_5$ and $WO_5$ or $MoO_3$, and they wre subjected to repeated charge-discharge tests at 1 mA and at 140 Ah/kg. The results are shown in Table 12.

TABLE 12

Charge-Discharge Cycle Performance Characteristics (Cycle Number) When Subjected to Repeated Charge-Discharge Cycles at 1 mA and at 140 Ah/kg

| Cathode Active Material | | Electrolyte | |
|---|---|---|---|
| Composition | Mixing Ratio by mole | 1 N LiClO$_4$/ PC—DME | 1.5 N LiAsF$_6$/ 2 Me—THF |
| $V_2O_5$—$P_2O_5$—$WO_3$ | 98:1:1 | 62 | 131 |
| | 90:5:5 | 62 | 151 |
| | 80:10:10 | 66 | 165 |
| | 60:39:1 | 65 | 145 |
| | 74:1:25 | 59 | 126 |
| $V_2O_5$—$P_2O_5$—$MoO_3$ | 98:1:1 | 59 | 121 |
| | 90:5:5 | 61 | 132 |
| | 80:10:10 | 67 | 141 |
| | 60:39:1 | 63 | 126 |
| | 74:1:25 | 57 | 119 |

As seen, the battieries prepared by using the cathode active materials set forth in Table 12 have excellent charge-discharge performance characteristics.

$V_2O_5$ was mixed with a first additive selected from $Sb_2O_3$ and $Bi_2O_3$, and further added with a second additive selected from $WO_3$ and $MoO_3$ in a predetermined ratio, followed by melting and subsequent quenching, to prepare a cathode active material. Following procedures were the same as described above to form a cathode mixture pellet which was used in the preparation of a coin-shaped battery. Similar batteries were prepared by changing the use first and second additives and by varying the mixing ratio.

The thus prepared batteries were subjected to repeated charge-discharge tests at 1 mA and at 140 Ah/kg. The cycling behaviors of the thus prepared batteries are similar to that as shown in FIG. 9. Each of the curves has a relatively fair flatness. The results of cycling tests conducted on those batteries are shown in Table 13.

TABLE 13

Charge-Discharge Cycle Performance Characteristics (Cycle Number) When Subjected to Repeated Charge-Discharge Cycles at 1 mA and at 140 Ah/kg

| Cathode Active Material (Mole ratio) | | Electrolyte | |
|---|---|---|---|
| | | 1 N LiClO$_4$/ PC—DME | 1.5 N LiAsF$_6$/ 2 Me—THF |
| V$_2$O$_5$—Sb$_2$O$_3$—WO$_3$ | (8:1:1) | 96 | 192 |
| V$_2$O$_5$—Sb$_2$O$_3$—MoO$_3$ | (8:1:1) | 84 | 154 |
| V$_2$O$_5$—Bi$_2$O$_3$—WO$_3$ | (8:1:1) | 79 | 188 |
| V$_2$O$_5$—Sb$_2$O$_3$—MoO$_3$ | (8:1:1) | 78 | 191 |
| V$_2$O$_5$—B$_2$O$_3$—WO$_3$ | (7:1:2) | 66 | 154 |
| V$_2$O$_5$—B$_2$O$_3$—MoO$_3$ | (7:1:2) | 64 | 138 |

The batteries prepared by using the cathode active materials set forth in Table 13 showed excellent charge-discharge performance characteristics.

What is claimed is:

1. A lithium battery comprising:
    a cathode active material made of an amorphous material prepared by mixing V$_2$O$_5$ with 1 mol % to 40 mol % of at least one metal oxide selected from the group consisting of P$_2$O$_5$, TeO$_2$, GeO$_2$, Sb$_2$O$_3$, Bi$_2$O$_3$ and B$_2$O$_3$, heating to melt the admixture and then quenching the molten admixture at a rate of at least 10$^2$° C./sec;
    an anode active material made of at least one selected from the group consisting of metallic lithium and lithium alloys; and
    an electrolyte selected from the group consisting of mixtures of aprotic organic solvents with lithium salts, molten salts containing Li ions as the conductors, and solid electrolytes of Li ions.

2. The lithium battery as claimed in claim 1, wherein said amorphous cathode active material is selected from the group consisting of V$_2$O$_5$—P$_2$O$_5$, V$_2$O$_5$—TeO$_2$, V$_2$O$_5$—Sb$_2$O$_3$, V$_2$O$_5$—Bi$_2$O$_3$, V$_2$O$_5$—B$_2$O$_3$, V$_2$O$_5$—TeO$_2$—Sb$_2$O$_3$, V$_2$O$_5$—TeO$_2$—Bi$_2$O$_3$, V$_2$O$_5$—TeO$_2$—B$_2$O$_3$, V$_2$O$_5$—GeO$_2$—Sb$_2$O$_3$, V$_2$O$_5$—GeO$_2$—Bi$_2$O$_3$ and V$_2$O$_5$—GeO$_2$—B$_2$O$_3$ 3. The lithium battery as claimed in claim 1, wherein said aprotic solvent of said electrolyte is at least one selected from the group consisting of propylene carbonate, 2-methyltetrahydrofuran, dioxolane, tetrahydrofuran, 1, 2-dimethoxyethane, ethylene carbonate, γ-butyrolactone, dimethyl sulfoxide, acetonitrile, formamide, dimethylformamide and nitromethane.

4. The lithium battery as claimed in claim 1, wherein said lithium salt of said electrolyte is at least one selected from the group consisting of LiBF$_4$, LiClO$_4$, LiPF$_6$, LiCl, LiAlCl$_4$, LiAsF$_6$, LiSbF$_6$.

5. A lithium battery comprising:
    a cathode active material made of an amorphous V$_{2pl}$O$_5$ material prepared by heating to melt V$_2$O$_5$ followed by quenching at a rte of at least 10$^2$° C./sec;
    an anode active material made of at least one selected from the group consisting of metallic lithium and lithium alloys; and
    an electrolyte selected from the group consisting of mixtures of aprotic organic solvents with lithium salts, molten salts containing Li ions as the conductors, and solid electrolytes of Li ions.

6. The lithium battery as claimed in claim 5, wherein said aprotic organic solvent of said electrolyte is at least one selected from the group consisting of propylene carbonate, 2-methyltetrahydrofuran, dioxolane, tetrahydrofuran, 1, 2-dimethoxyethane, ethylene carbonate, γ-butyrolactone, dimethyl sulfoxide, acetonitrile, formamide, dimethylformamide and nitromethane.

7. The lithium battery as claimed in claim 5, wherein said lithium salt of said electrolyte is at least one selected from the group consisting of LiBF$_4$, LiClO$_4$, LiPF$_6$, LiCl, LiAlCl$_4$, LiAsF$_6$, LiSbF$_6$.

8. A lithium battery comprising:
    a cathode active material made of an amorphous V$_2$O$_5$ material prepared by mixing V$_2$O$_5$ with 5 mol% to 90 mol% of at least one metal oxide selected from the group consisting of MoO$_3$ and WO$_3$, heating to melt the admixture and then quenching the molten admixture at a rate of at least 10$^2$° C./sec;
    an anode active material made of at least one selected from the group consisting of metallic lithium and lithium alloys; and
    an electrolyte selected from the group consisting of mixtures of aprotic organic solvents with lithium salts, molten salts containing Li ions as the conductors, and solid electrolytes of Li ions.

9. The lithium battery as claimed in claim 8, wherein said amorphous cathode active material is selected from the group consisting of V$_2$O$_5$—MoO$_3$ and V$_2$O$_5$—WO$_3$.

10. The lithium battery as claimed in claim 8, wherein said aprotic solvent of said electrolyte is at least one selected from the group consisting of propylene carbonate, 2-methyltetrahydrofuran, dioxolane, tetrahydrofuran, 1, 2-dimethoxyethane, ethylene carbonate, γ-butyrolactone, dimethyl sulfoxide, acetonitrile, formamide, dimethylformamide and nitromethane.

11. The lithium battery as claimed in claim 8, wherein said lithium salt of said electrolyte is at least one selected from the group consisting of LiBF$_4$, LiClO$_4$, LiPF$_6$, LiCl, LiAlCl$_4$, LiAsF$_6$, LiSbF$_6$.

12. A lithium battery comprising:
    a cathode active material made of an amorphous material prepared by mixing V$_2$O$_5$ with 1 mol% to 39 mol% of at least one first additive selected from the group consisting of P$_2$O$_5$, TeO$_2$, GeO$_2$, Sb$_2$O$_3$, Bi$_2$O$_3$ and B$_2$O$_3$ and further added with 1 mol% to 25 mol% of at least one second additive selected from the group consisting of MoO$_3$ and WO$_3$, heating to melt the admixture and then quenching the molten admixture at a rate of at least 10$^2$° C./sec;
    an anode active material made of at least one selected from the group consisting of metallic lithium and lithium alloys; and
    an electrolyte selected from the group consisting of mixtures of aprotic organic solvents with lithium salts, molten salts containing Li ions as the conductors, and solid electrolytes of Li ions.

13. The lithium battery as claimed in claim 12, wherein said amorphous cathode active material is selected from the group consisting of V$_2$O$_5$—P$_2$O$_5$—WO$_3$, V$_2$O$_5$—P$_2$O$_5$—MoO$_3$, V$_2$O$_5$—TeO$_2$—WO$_3$, V$_2$O$_5$—TeO$_2$—MoO$_3$, V$_2$O$_5$—GeO$_2$—WO$_3$, V$_2$O$_5$—GeO$_2$—MoO$_3$, V$_2$O$_5$—Sb$_2$O$_3$—WO$_3$, V$_2$O$_5$—Sb$_2$O$_3$—MoO$_3$, V$_2$O$_5$—Bi$_2$O$_3$—WO$_3$, V$_2$O$_5$—Bi$_2$O$_3$—MoO$_3$, V$_2$O$_5$—B$_2$O$_3$—WO$_3$ and V$_2$O$_5$—B$_2$O$_3$—MoO$_3$.

14. The lithium battery as claimed in claim 12, wherein said aprotic solvent of said electrolyte is at least one selected from the group consisting of propylene carbonate, 2-methltetrahydrofuran, dioxolane, tetrahydrofuran, 1, 2-dimethoxyethane, ethylene carbonate, γ-butyrolacton, dimethyl sulfoxide, acetonitrile, formamide, dimethylformamide and nitromethane.

15. The lithium battery as claimed in claim 12, wherein said lithium salt of said electrolyte is at least one selected from the group consisting of LiBF$_4$, LiClO$_4$, LiPF$_6$, LiCl, LiAlCl$_4$, LiAsF$_6$, LiSbF$_6$.

* * * * *